United States Patent [19]

Noggle

[11] Patent Number: 5,405,711
[45] Date of Patent: * Apr. 11, 1995

[54] INDEXABLE INSERTS WITH POLYCRYSTALLINE CUTTING EDGE

[75] Inventor: Kenneth G. Noggle, West Bloomfield, Mich.

[73] Assignee: Valenite Inc., Madison Heights, Mich.

[*] Notice: The portion of the term of this patent subsequent to Mar. 16, 2010 has been disclaimed.

[21] Appl. No.: 122,965

[22] Filed: Sep. 20, 1993

[51] Int. Cl.6 .............................................. B32B 18/00
[52] U.S. Cl. ................................. 428/698; 428/689; 428/699; 407/114; 407/115; 407/116; 407/119
[58] Field of Search ............... 428/688, 689, 698, 699, 428/336, 472; 407/116, 114, 115, 119

[56] References Cited

U.S. PATENT DOCUMENTS

| | | | |
|---|---|---|---|
| 4,498,549 | 2/1985 | Jürgens | 407/119 |
| 4,605,343 | 8/1986 | Hibbs, Jr. | 407/119 |
| 4,854,784 | 8/1989 | Murray | 407/119 |
| 4,899,922 | 2/1990 | Slutz et al. | 228/121 |
| 5,082,401 | 1/1992 | Niebauer | 407/116 |
| 5,193,948 | 3/1993 | Noggle | 407/116 |

*Primary Examiner*—Ellis P. Robinson
*Assistant Examiner*—Timothy M. Speer
*Attorney, Agent, or Firm*—Bill C. Panagos

[57] ABSTRACT

An indexable cutting insert having a polycrystalline cutting edge along the entire periphery of the insert, comprising a top surface, a bottom surface and a side wall extending unbroken therebetween to form a body, said body comprised of a composite wafer of cemented carbide, polycrystalline material and cemented carbide material, a cutting edge formed of polycrystalline material, and a chip breaker rearward of the cutting edge, said chip breaker formed by removal of a portion of cemented carbide from the at least one of the top or bottom surface of the insert at the junction of the sidewall and the top or bottom surface.

5 Claims, 1 Drawing Sheet

INDEXABLE INSERTS WITH POLYCRYSTALLINE CUTTING EDGE

BACKGROUND OF THE INVENTION

1. Field of the Invention

The present invention relates to an indexable cutting insert made of a tungsten carbide-polycrystalline-tungsten carbide composite wafer material wherein the tungsten carbide is ground to form a chip breaker and thereby reveal the polycrystalline material for use as a cutting edge. The polycrystalline material may be diamond, cubic boron nitride (cBN), or any other suitable polycrystalline material.

The present invention further relates to the use of a polycrystalline composite material as a cutting insert which does not have to be bonded or brazed or otherwise affixed to an insert body.

2. Description of the Related Art

Noggle, U.S. Pat. No. 5,193,948 discloses a cutting insert having a pocket formed at one corner of the insert and a wafer of tungsten carbide-polycrystalline-tungsten carbide bonded thereto. The top surface of the wafer is ground away to form a chip breaker and to expose a polycrystalline diamond cutting surface.

The insert of Noggle '948 is not truly indexable unless a pocket is formed in each corner of the insert body and a wafer is bonded into the pocket to provide the polycrystalline cutting edge. Moreover, forming multiple pockets and bonding polycrystalline wafers thereto is expensive and time consuming. Thus, where indexablity is required, there was a long felt need.

Murray et al., U.S. Pat. No. 4,854,784 discloses a diamond tipped chip control insert which incorporates a polycrystalline diamond or cubic boron nitride material therein as a cutting edge material. The insert substrate includes integral chip control features which eliminate the need for the use of separately attached mechanical chip breakers.

Murray et al., '784 differs from the present invention because Murray requires that a chip breaker first be formed and then a slot is cut into the insert body and a polycrystalline material is finally bonded into the slot. This arrangement is expensive, labor intensive, and does not provide true indexability of a polycrystalline cutting edge.

Jurgens, U.S. Pat. No. 4,498,549 discloses a cutting member for a rotary drill bit comprised of a substrate to which is bonded a polycrystalline material. The drill does not have any chip breaker features and neither does it utilize the tungsten carbide-polycrystalline-tungsten carbide wafer of the present invention.

Bibbs, Jr. et al., U.S. Pat. No. 4,605,343 discloses a sintered polycrystalline diamond compact having an integral metallic heat sink bonded to and covering at least the outer diamond surface. The metallic heat sink is used to increase compact life when the compact is used for material removal without fluid coolant. The present invention does not require a metallic heat sink to achieve dry cutting. In addition, the present invention provides for a chip breaker as well as indexablity of the insert such that polycrystalline material is present at the cutting edge of the insert.

Slutz et al., U.S. Pat. No. 4,899,922 discloses a brazed thermally stable polycrystalline diamond compact having a network of interconnected empty pores dispersed throughout the compact and bonded to a substrate by brazing filler metal which may be an alloy having a liquidus above about 700 degrees C. Slutz et al., '922 is directed to the manner in which the polycrystalline material is bonded to the insert. There is no showing in Slutz et al., '922 of using a polycrystalline wafer as a metal cutting insert having indexability.

SUMMARY OF THE INVENTION

The present invention relates to an indexable cutting insert made of a composite of cemented carbide-polycrystalline material-cemented carbide wherein a chip breaker design is formed on one surface to expose a polycrystalline material as the cutting edge of the insert. An insert formed in this manner is truly indexable such that the polycrystalline material is presented as a cutting edge around the entire periphery of the insert.

DETAILED DESCRIPTION OF THE PREFERRED EMBODIMENT

Figure 1:
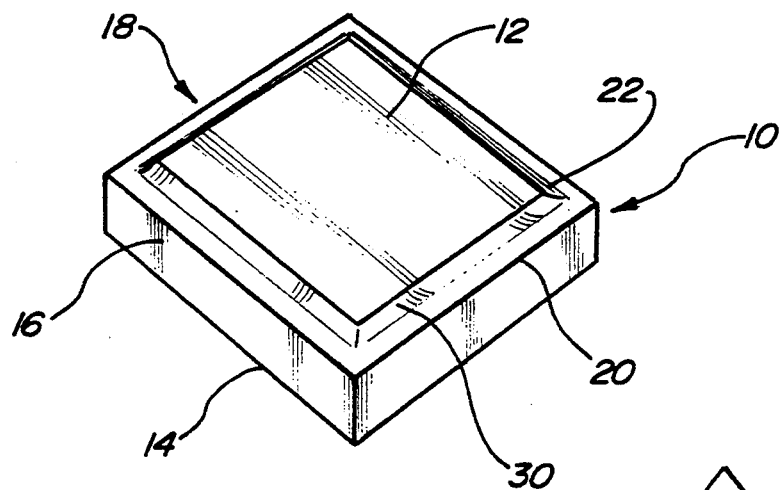
FIG. 1 is a top perspective view of the insert of the present invention.
Figure 2:
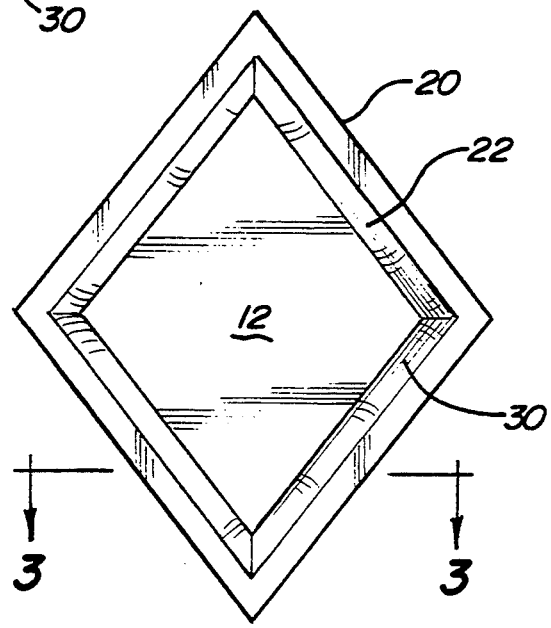
FIG. 2 is a top plan view of the insert showing the features thereof.

Turning now to the drawings wherein like numeral depict like structures, a specifically to FIG. 1, insert 10 has a top face 12, a bottom face 14 and a side wall 16 running substantially unbroken therebetween to define a body 18 of the insert. The insert is shown as polygonal, but it is also contemplated that it could be circular or any shape as desired. For matters of convention, but not as a limiting feature, the side wall may be further broken down into flank sections which, in the case of a polygonal insert, are that portion of side wall which extends from corner to the adjacent corner of the insert. In the circumstance wherein the insert is not polygonal, the flank sections of the insert are that portion of the sidewall which is oriented toward the viewer.

The insert further includes a cutting edge 20, which is formed of a polycrystalline material such as diamond or cBN, or any other suitable polycrystalline material. The cutting edge is formed by grinding or removing a portion of the top and/or bottom surface at the junction of the sidewall and the top or bottom surface to form the chip breaker 22. Thus, it can be seen that the insert is truly indexable as the chipbreaker extends around the entire periphery of the insert, thereby presenting multiple sides for use in cutting operations. The chipbreaker is ground into the top surface and is seen as being concave so as to present at least one clearance surface 30 is integral with the chip breaker and is in close proximity to the cutting edge. Those skilled in the art will recognize that any manner of chip breaker may be formed in the top surface to expose the polycrystalline cutting edge.

Figure 3:
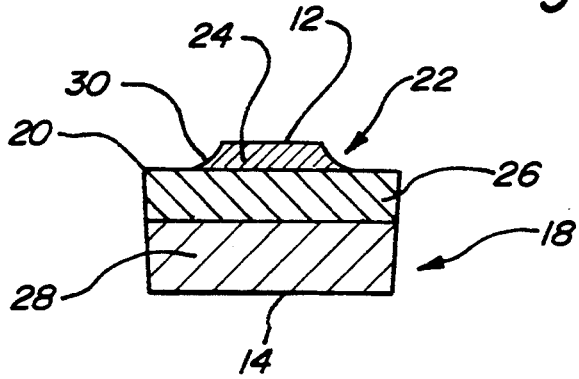
FIG. 3 is a side sectional view of the insert taken along line 4—4 showing the different layers of its construction.

Turning now to FIG. 3, there is shown a side sectional view of the insert taken along line 4—4 which shows the construction of the insert body. Specifically, the insert body is a composite wafer of cemented carbide 24, polycrystalline material 26 and a cemented carbide layer 28. Such wafers are now available in sizes sufficiently large to be used as insert bodies and are commonly known as DRILpax, the tradename of the product available from Mega Diamond, a Division of Smith International, Inc., of Provo Utah. Preferably, the polycrystalline material is diamond, but may also be comprised of cBN or any other suitable polycrystalline material. The cemented carbide portions of the wafer are preferably tungsten carbide, but other cemented carbide materials are contemplated for use as well. The insert is formed by machining such a composite blank to the thickness and dimension of a desired insert thickness. When the desired thickness is attained, a chip breaker can be machined in the top surface to expose the polycrystalline material for use as the cutting edge.

In operation, the insert is clamped or otherwise secured into a tool holder and presented to the work piece in any manner as is well known to those of ordinary skill in the art. The Polycrystalline cutting edge has special application in cutting highly abrasive materials, such as aluminum and high strength steel.

Those skilled in the art will recognize that may modifications are possible to the above described invention without departing from the scope and spirit of the invention as defined in the appended claims.

I claim:

1. An indexable cutting insert having a polycrystalline cutting edge along the entire periphery of the insert, comprising a top surface, a bottom surface and a side wall extending unbroken therebetween to form a body, said body formed of a composite wafer comprising a first cemented carbide layer, a second polycrystalline layer, a third cemented carbide layer, a cutting edge formed of polycrystalline material and a chip breaker rearward of the cutting edge, said chip breaker formed by removal of a portion of cemented carbide from at least one of the top or bottom surfaces of the insert at the junction of the sidewall and the top or bottom surface.

2. The insert of claim 1, wherein the polycrystalline cutting edge is selected from the group consisting of polycrystalline diamond, cubic boron nitride, and mixtures thereof.

3. The insert of claim 1, wherein the cemented carbide material is tungsten carbide.

4. The insert of claim 1, wherein the insert is polygonal in shape.

5. The insert of claim 1, wherein the insert chip breaker is further equipped with a clearance surface integral with the chip breaker.

* * * * *